May 20, 1958  E. N. JACOBS  2,835,049
COMBINED RACK AND DRIER
Filed Sept. 7, 1955
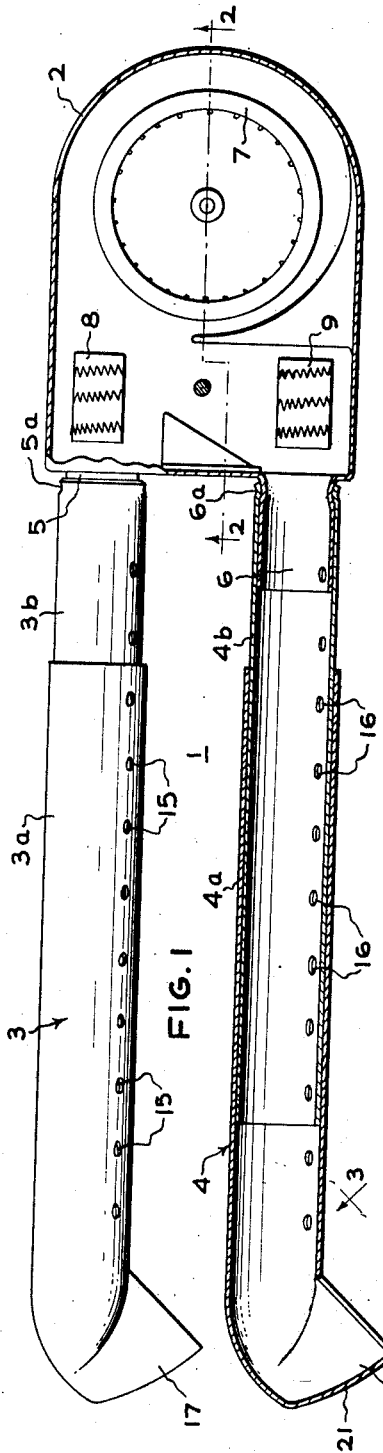
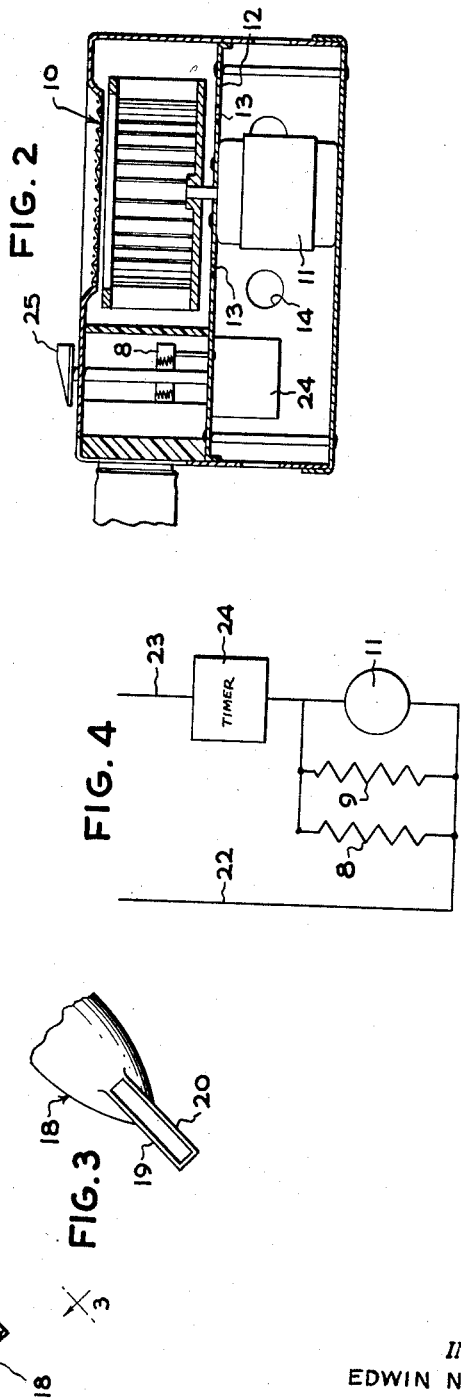
INVENTOR.
EDWIN N. JACOBS
BY *Harry F. Manbeck, Jr.*
HIS ATTORNEY United States Patent Office 2,835,049
Patented May 20, 1958

2,835,049

COMBINED RACK AND DRIER

Edwin N. Jacobs, Louisville, Ky.

Application September 7, 1955, Serial No. 532,883

3 Claims. (Cl. 34—151)

My invention relates to a combined rack and drier for towels, clothes and the like, and it has for its principal object the provision of an improved appliance of that type which may alternatively be used as a drier for the hands or face.

A more specific object of my invention is to provide such an appliance having improved means for directing a stream of heated air over the article to be dried, whereby rapid drying of the article is facilitated.

A combined rack and drier is of particular use for the small loads of clothing which are often hand washed and left to dry in the kitchen or bathroom. A combined rack and drier enables them to be dried quickly and effectively and thus avoids lengthy littering of the room. Also, the musty smell usually accompanying the indoor drying of clothes is substantially avoided. Such an appliance is, of course, capable of even greater utility if it is also usable as a drier for the hands and face as is contemplated by this invention.

In carrying out my invention I provide a combined rack and drier having a housing in which are mounted air heating means and a blower. Mounted on the housing and communicating with the interior thereof is at least one tubular rack element. During operation of the appliance the blower blows air over the heating means and through the tubular rack element. At the end of the rack element there is formed nozzle means which direct the heated air in a free flowing stream back past the element. This air stream is effective to dry any articles hung on the rack element or alternatively may be used to dry the hands or the face. The air stream due to its speed and angle of discharge relative to the rack element dries either the articles or the hands and face very rapidly. Preferably, the rack element is rotatably mounted to provide for directing the air stream in a convenient direction for drying the hands or the face.

The features of my invention which I believe to be novel are pointed out with particularity in the appended claims. My invention itself, however, may be best understood by reference to the following description taken in conjunction with the accompanying drawing in which:

Fig. 1 is a front elevational view of a combined rack and drier embodying my invention, the view being partially broken away and partially in section to illustrate details of my invention;

Fig. 2 is a sectional view taken on the line 2—2 of Fig. 1;

Fig. 3 is a fragmentary sectional view taken on line 3—3 of Fig. 1; and

Fig. 4 is a schematic diagram of a preferred electrical circuit for the appliance of Fig. 1.

Referring now to Fig. 1 I have shown therein a combination rack and drier 1 embodying my invention in one preferred form thereof. The appliance 1 includes a housing 2 and a plurality of tubular rack elements 3 and 4 mounted on the housing. The racks are mounted respectively by means of nipples or tubes 5 and 6 formed integrally with the housing, and they communicate with the interior of the housing through the tubes. Preferably and as shown, the fit between the racks and the tubes is such that the racks are rotatable about their longitudinal axis. The racks are retained on the tubes by any suitable means as for example the mating indentations indicated at 5a and 6a respectively. Each of the racks is comprised of a pair of telescoping elements allowing extension of the rack to various suitable lengths. The two members of rack 3 are indicated at 3a and 3b, and the two members of rack 4 at 4a and 4b.

Besides serving as racks the tubular elements 3 and 4 also serve as conduits whereby heated air is circulated over any articles hung thereon. Heated air is introduced into the elements 3 and 4 by means of suitable means mounted in the housing 2. These means in my preferred embodiment comprise the centrifugal blower 7 and the electrical heaters 8 and 9. The blower 7 pulls air into the housing through a screened air inlet opening 10 and discharges it over the heaters. The heaters heat the air to a suitable temperature for drying clothing and the hands and face as it passes over them.

The blower 7 is driven by an electrical motor 11 also mounted in housing 2. A partition 12 separates the motor from the blower and the heaters. However apertures 13 in the partition and an air inlet opening 14 in the rear of the motor compartment provide for the blower to pull a flow of cooling air over the motor. The heat added to this air by the motor is then available for drying purposes as the air passes into racks 3 and 4.

The heated air blown into the tubular rack elements 3 and 4 by blower 11 flows axially therethrough toward the outer ends of the elements. Each of the elements is provided a longitudinal row of holes, the element 3 including holes 15 and the element 4 including holes 16; and as the air proceeds toward the end of the elements, some of it escapes through these holes. In fact, the air escaping through these holes forms a stream for drying the inner surfaces of any articles, for example, towels, hung over the elements.

A substantial portion of the air flowing through the rack elements, however, reaches the ends thereof; and in my invention there are provided at the ends of the tubes air discharge means for directing this air outwardly and back along the elements at an acute angle therto. These air discharge means comprise elbows 17 and 18, which in my preferred embodiment are formed integrally on the ends of the respective elements. It will be obvious however that the elbows could comprise separate members mounted on the tubes by suitable means, such as by threaded engagement.

Each of the elbows 17 and 18 is in effect necked down toward its outer or discharge end, as viewed in Fig. 1, so that it forms a nozzle effective to direct the air outwardly and rearwardly toward the housing in a free-flowing stream. In my preferred embodiment the discharge portions of the elbows each comprise narrowly spaced, flat side walls 19 and 20 (see Fig. 3) and a curved outer wall 21 (see Fig. 1). The curved outer wall turns the air in the desired direction of discharge, and the narrowly spaced side walls form nozzle means effective to accelerate the air flow to a relatively high rate compared to that at which it flows through the rack elements. Thus a relatively high velocity stream of heated air is discharged from the elbows or nozzle means into any articles hung on the rack elements.

As a result of the stream of air discharged from elbows 17 and 18, articles hung on the rack elements are dried much faster than if the rows of holes 15 and 16 comprised the only air discharge means from the elements. In fact, for some types of articles the drying time is cut almost in half.

The stream of air discharged from the elbows also has the advantage that it enables the unit 1 to be used as a hands and face drier as well as a combined article rack and drier. As mentioned above, both rack elements 3 and 4 are rotatable on their mountings. By turning them to the proper angle the air stream from the elbows may be directed outwardly at a proper angle for striking the hands or the face. A high velocity stream of heated air such as is set up by the nozzle means of the elbows is of course very effective for drying the hands and face or in fact any portion of the body. The unit 1 is thus equally effective as that type of drier as well as a clothes drier.

In my preferred embodiment the two sections of the respective rack elements are keyed together by suitable means (not shown) so the entire rack element is turned when either section is rotated. Thus the air escaping through all the holes 15 and 16 is also directed outwardly in the same plane as this air from the elbows to aid in the drying effect. However, the outer sections 3a and 4a of the racks could be rotatable with respect to the inner sections 3b and 4b if it were desired to reduce manufacturing cost by omitting the keying means. The drying effect of the air escaping through the holes in the inner rack portions 3b and 4b would ordinarily be lost though when the unit was being used as a hands or face dryer with the outer rack portions 3a and 4a turned to discharge air at a different angle.

In Fig. 4, I have shown schematically an electrical circuit suitable for use in the unit 1. In this circuit the heaters 8 and 9 and the motor 11 are energized in parallel from 110 volt supply conductors 22 and 23 through a suitable timer 24. On their one sides the heaters and the motor are connected directly to conductor 22, and on their other sides they are connected to conductor 23 through timer 24. The timer 24 thus controls the period of operation of the unit whenever it is turned on, since the timer controls both the motor and the heaters. Any suitable timer may be used, but a bimetallic timer of the type commercially available is preferred. As shown in Fig. 2, the timer includes a knob 25 which both turns the unit "on" and determines the period of operation of unit before it shuts "off."

From the above it will be seen that by my invention I have povided a new and improved combination rack and drier which may also be used as a hands and face drier. Dut to the air discharge or nozzle means at the ends of the tubular rack elements the unit is particularly effective to dry articles hung on the racks. The rotatable mounting of the rack elements combined with the nozzle means enable the unit also to be utilized as a hands and face drier. It will be also noted that the unit is relatively light, for example the illustrated unit in its preferred size weighs less than five pounds, whereby it may be advantageously employed as a portable unit.

While in accordance with the patent statutes, I have shown what at present is considered to be the preferred embodiment of my invention, it will be obvious to those skilled in the art that various changes and modifications may be made therein without departing from the invention and I, therefore, aim in the appended claims to cover all such equivalent variations as fall within the true spirit and scope of the invention.

What I claim as new and desire to secure by Letters Patent of the United States is:

1. A combined rack and drier comprising a housing, air heating means mounted in said housing, a plurality of tube-like elements mounted on said housing and communicating with the interior thereof, said elements each including telescoping, extensible portions, a blower mounted in said housing for blowing air over said heating means and through said elements, said elements each having a row of perforations extending longitudinally therealong for discharging a portion of the heated air, and flow-accelerating nozzle means formed on the end of each of said elements for discharging the remainder of the heated air back along said elements.

2. A combined rack and drier comprising a housing, air heating means mounted within said housing, at least one elongated tubular rack element mounted on said housing and communicating with the interior thereof, air moving means mounted in said housing for blowing air over said heating means and through said rack element, said rack element having a row of perforations extending longitudinally therealong for discharging a portion of the heated air, and flow-accelerating nozzle means mounted at the outer end of said rack element for discharging the remainder of the heated air in a free-flowing stream back along said element.

3. The combination of claim 2 wherein the outlet of said nozzle means is of an elongated generally rectangular shape for discharging the air back along said rack element in a sheet like flow.

References Cited in the file of this patent

UNITED STATES PATENTS

| | | |
|---|---|---|
| Re.17,237 | Martin | Mar. 12, 1929 |
| 761,451 | Cuvelier | May 31, 1904 |
| 1,018,037 | Dunham | Feb. 20, 1912 |
| 1,946,638 | Rasmussen | Feb. 13, 1934 |
| 2,668,368 | Jacobs | Feb. 9, 1954 |
| 2,707,838 | Braman | May 10, 1955 |

FOREIGN PATENTS

| | | |
|---|---|---|
| 357,901 | Great Britain | Oct. 1, 1931 |